(12) United States Patent
Walluszik et al.

(10) Patent No.: US 11,416,301 B2
(45) Date of Patent: Aug. 16, 2022

(54) DATA PROCESSING DEVICE AND METHOD FOR OPERATING A DATA PROCESSING DEVICE

(71) Applicant: Infineon Technologies AG, Neubiberg (DE)

(72) Inventors: Konrad Walluszik, Munich (DE); Juergen Schaefer, Oberhaching (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/167,546

(22) Filed: Feb. 4, 2021

(65) Prior Publication Data
US 2021/0248013 A1    Aug. 12, 2021

(30) Foreign Application Priority Data
Feb. 7, 2020    (DE) .................... 10 2020 103 194.7

(51) Int. Cl.
*G06F 9/50*    (2006.01)
*G06F 9/54*    (2006.01)
(52) U.S. Cl.
CPC .............. *G06F 9/5027* (2013.01); *G06F 9/54* (2013.01)
(58) Field of Classification Search
None
See application file for complete search history.

(56) References Cited

U.S. PATENT DOCUMENTS

2020/0242258 A1*    7/2020    Smith .................... H04L 9/0894

OTHER PUBLICATIONS

Fusella, Edoardo; "On-Chip Communication in the Many-core Era"; University of Naples Federico II, Department of Electrical Engineering and Information Technology; Mar. 2015.

(Continued)

*Primary Examiner* — Scott C Sun
(74) *Attorney, Agent, or Firm* — Eschweiler & Potashnik, LLC

(57) ABSTRACT

A data processing device is provided. The data processing device includes at least one processor circuit, at least one additional circuit, an accelerator circuit, a first data connection which at least connects the at least one processor circuit to the accelerator circuit and is configured to exchange data between the at least one processor circuit and the accelerator circuit, a second data connection which connects the at least one processor circuit to the at least one additional circuit and is configured to exchange data between the at least one additional circuit and the processor circuit, wherein the first data connection has a higher data rate or a lower latency than the second data connection, and includes an address segment having a first address range, which has at least one first address each for the at least one additional circuit and the accelerator circuit, and a second address range which has at least one second address each for the at least one additional circuit and the accelerator circuit, wherein the data processing device is configured to exchange data using the first data connection when addressing using one of the first addresses, and to exchange data using the second data connection when addressing using one of the second addresses.

24 Claims, 7 Drawing Sheets

(56) References Cited

OTHER PUBLICATIONS

Nicopoulos, C.; "The Quest for Scalable On-Chip Interconnections Networks: Bus/NoC Hybridization [15]"; Lecture Notes in Eleclrical Engineering 45, Springer Science+Business Media B.V.; 2009.
Mullins, Robert; "7—On-Chip Interconnection Networks"; Chip Multiprocessors (ACS MPhil); Mar. 26, 2017.

* cited by examiner

DATA PROCESSING DEVICE AND METHOD FOR OPERATING A DATA PROCESSING DEVICE

REFERENCE TO RELATED APPLICATION

This application claims priority to German Application No. 10 2020 103 194.7, filed on Feb. 7, 2020, the contents of which are hereby incorporated by reference in their entirety.

FIELD

The disclosure relates to a data processing device and a method for operating the data processing device.

BACKGROUND

Demands on data processing devices in terms of the volume of data to be processed and the speed at which data must be processed have recently become an ever-growing challenge.

To go some way to satisfying these requirements, accelerator circuits (hardware accelerators, or accelerators for short) are often used.

SUMMARY

In various exemplary embodiments, a data processing device having an accelerator circuit is provided, which enables applications involving both high data rates and low latency to be implemented by means of the same accelerator circuit.

Exemplary embodiments of the disclosure are shown in the drawings and will be explained in more detail in the following.

DETAILED DESCRIPTION

Figure 1A:
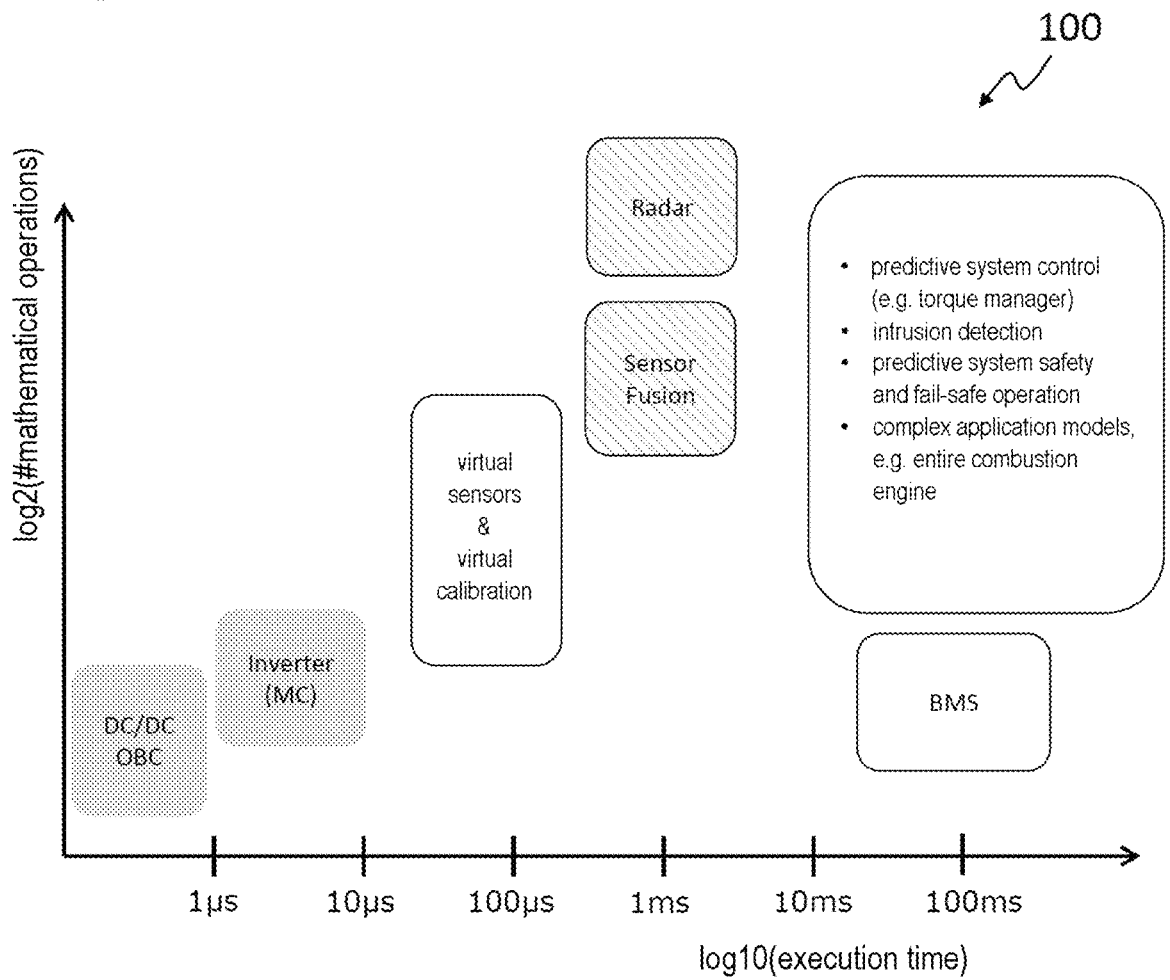
FIG. 1A shows a graph illustrating, for an automotive sector, examples of functions for which accelerators are used and the requirements associated with them.

In the detailed description that follows, reference will be made to the attached drawings, which form part of this application and in which specific embodiments in which the disclosure may be realized are shown for illustration purposes. In this respect, directional terms such as "at the top", "at the bottom", "in front", "behind", "frontal", "rear", etc. are used with respect to the orientation of the figures being described. Because components of embodiments can be positioned in a number of different orientations, the directional terminology is used for illustration purposes only, and is in no way restrictive. It is understood that other embodiments can be used and structural or logical changes can be made without departing from the scope of protection of the present disclosure. It goes without saying that the features of the various exemplary embodiments described herein can be combined with one another, unless specifically stated otherwise. The following detailed description is therefore not to be understood in a restrictive sense, and the scope of protection of the present disclosure is defined by the attached claims.

For the purposes of this description, the terms "connected" and "coupled" are used to describe both a direct and indirect connection, and a direct or indirect coupling. In the figures, identical or similar elements are labeled with identical reference numerals, where this is appropriate. In this disclosure the term "exemplary" is intended to mean "example" rather than "preferred" or "optimal."

In order to be able to individually address identical or similar components occurring in the description more than once, these are sometimes labeled with a generic reference sign (e.g. 330) followed by serial numbering (e.g. 330_1, 330_2, 330_3). Even if the generic reference sign is not given in the figures, it should be understood that, depending on the context, when the generic reference is used in the description either all components with this reference sign or any one of them is meant.

FIG. 1A shows a graph 100, which illustrates, for the example of an automotive sector, the applications or processes for which accelerators can be used and the requirements associated with them. On the x-axis, a logarithmic scale (base 10) is used to plot the execution time of a process, and on the y-axis a logarithmic scale (base 2) is used to plot the number of mathematical operations performed during the process.

Processes that should be executed at high speed (ideally in real time), and therefore have strict requirements for low latency, are highlighted in gray. This can affect, for example, a DC/DC converter of an on-board charger (OBC) installed in the vehicle, wherein the execution time can be e.g. less than one microsecond, and/or an inverter (e.g. for an engine control unit), in which the execution time can typically be less than 10 microseconds. The applications can be defined more precisely by means of topologies, the relevant mechanism and a frequency of the pulse width modulation.

Outlined in black are processes which (e.g. due to a large amount of data to be processed) require a relatively large number of mathematical operations to be performed. This may include, for example, virtual sensors or a virtual calibration, which can be more precisely defined by an engine type, e.g. combustion, number of cylinders, etc., and, for example, applications such as a battery management system (BMS; defined more precisely by battery voltage and energy class), a predictive system controller (e.g. for a torque manager), intrusion detection, predictive system safety and fail-safe operation, in addition to other complex application models that can relate to the internal combustion engine as a whole, wherein the latter can be more precisely defined, for example, by an electric-electronic architecture (E/E architecture) of the vehicle.

In addition, a vehicle can use applications in which it may be necessary to process a large amount of data within a short period of time (e.g. real-time or as close to it as possible). These are shown in white and gray hatching. This can relate, for example, to a radar system or a sensor data fusion, more precisely defined by the class of autonomous driving which is implemented. This case involves reference to the electrical-electronic architecture.

In summary, a distinction can be made between applications that require low latency and those that require a high data rate.

These low-latency systems are typically based on advanced open-loop and/or closed-loop control algorithms and perform complex data processing and model-based open-loop and closed-loop control of sensors and actuators, for example.

Figure 1B:
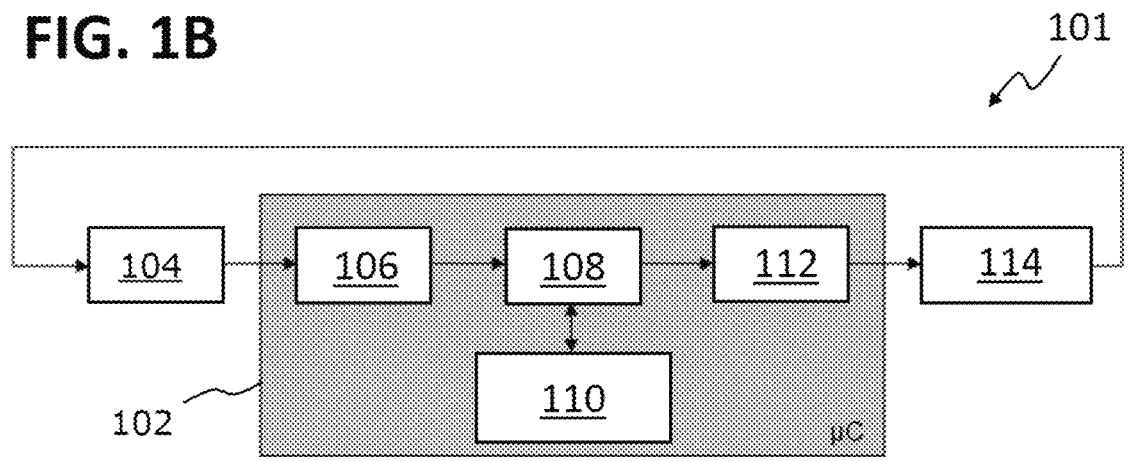
FIG. 1B shows a schematic illustration of a control loop implemented by means of a microcontroller.

FIG. 1B shows a schematic illustration of a control loop 101 implemented by means of a microcontroller 102, as might be used to implement such a low-latency system. An (input) signal 104 at 106 can be captured by the microcontroller 102. Signal processing 108 can be performed in interaction with a software execution environment 110. As a result of the signal processing 108, an (output) signal 112 can be generated, which can be used for actuating 114 an actuator and simultaneously forms an updated input signal 104.

The high data-rate systems typically involve applications in the field of artificial intelligence, such as system modeling and/or object classification using artificial neural networks, such as a multilayer perceptron (MLP), convolutional neural network (CNN), recurrent neural network (RNN) and/or radial basis function (RBF).

Figure 2A:
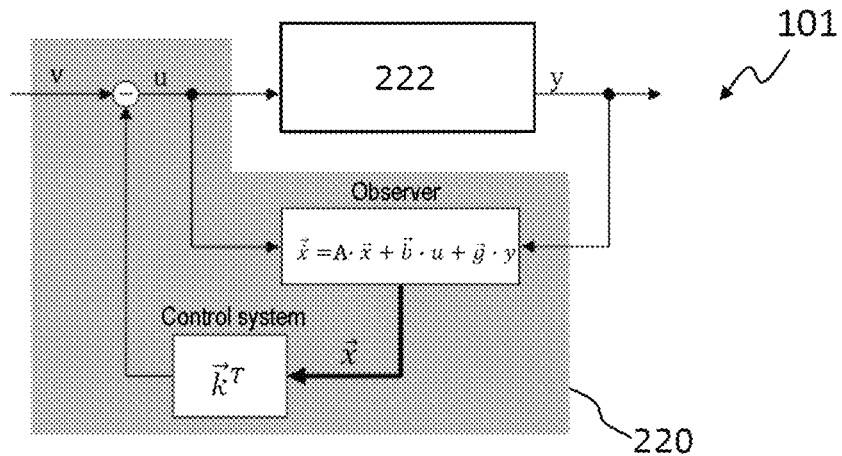
FIGS. 2A and 2B are intended to illustrate the requirements on an accelerator circuit.
Figure 2B:
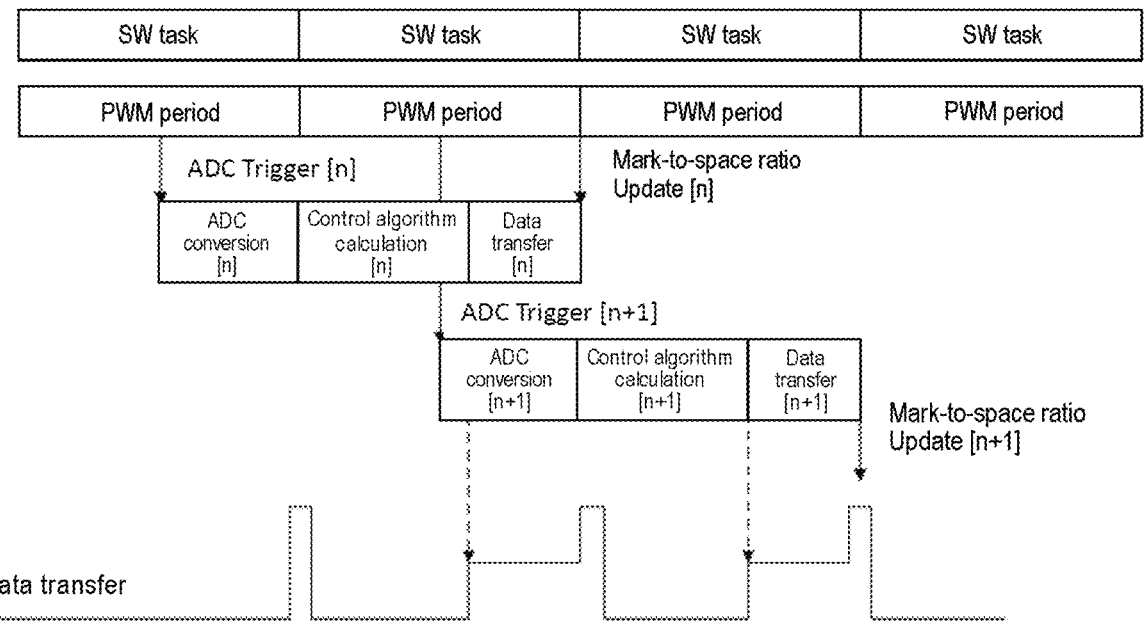

FIGS. 2A and 2B illustrate requirements on an accelerator circuit 220 of the kind that can be used in a control loop 101, which can be used, for example, for controlling an actuator 222 (e.g. electric motor, DC/DC converter, on-board battery charger (OBC) installed in the vehicle).

To control the OBC, for example, each cycle through the control loop should take a maximum of 15 µs, preferably less (e.g. 2 µs). For this, the pulse width modulation would require a resolution of approximately 500 ps, and hence an ADC sampling rate of approximately 5 MS/s. This means that the control algorithm must be executed within approximately 1 µs.

Similar considerations can apply, for example, to a closed-loop control of a DC/DC converter. Here, for example, each cycle through the control loop should take a maximum of 10 µs, preferably less (e.g. 2 µs). For this, the pulse width modulation would require a resolution of approximately 500 ps, and hence an ADC sampling rate of approximately 5 MS/s. This means that the control algorithm must be executed within approximately 1 µs.

FIG. 2B illustrates what "real time" can mean in connection with a control loop as in FIG. 2A, for example, that calculations of the control algorithm and data transmission to update the output signal should take place within one pulse width modulation period.

These times have become shorter and shorter in recent years, although some of the calculations are becoming increasingly complex.

This also increases the requirements on the (mathematical) accelerator 220, which should show a low latency and deterministic behavior at its output, i.e. between the accelerator 220 and the peripheral device (e.g. the actuator) 222.

Real-time application performance is limited by the latency of the connection between the mathematical accelerator 220 and the peripheral 222.

As a result of an increasing focus on energy-efficient high-performance engine control unit (ECU) architectures, parallel computing and dedicated hardware accelerators have been incorporated into the development of the latest System-on-Chip (SoC) designs.

As the number of computer cores, memory elements, and peripheral circuits increases, it becomes increasingly difficult to design SoC connections to meet both low-latency and high data-rate targets at the same time.

This is because latency optimization, data-rate optimization, and optimization of an efficient design typically require contradictory measures.

Figure 3:
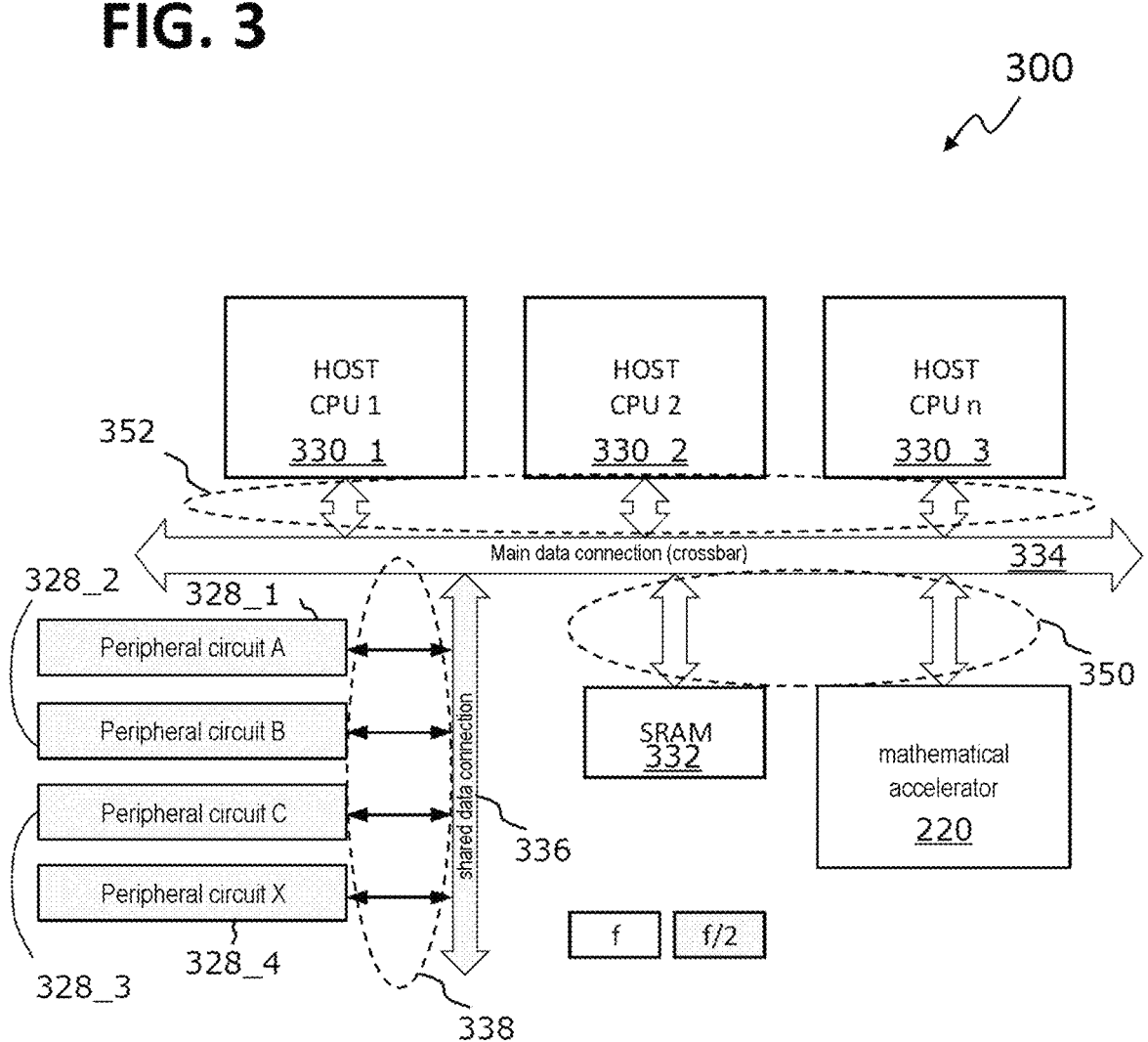
FIG. 3 shows a schematic illustration of a data processing device according to the prior art.

FIG. 3 shows a schematic illustration of a conventional data processing device 300, which will be used to explain which measures are currently implemented.

The data processing device 300 shows the architectural compromise between design goals and performance requirements for the connections relevant to the application.

The data processing device 300 has a plurality of main processors 330_1 to 330_3, a plurality of peripheral circuits 328_1 to 328_4, an accelerator 220 and a memory circuit 332. The data connections are realized as a so-called crossbar architecture, with a main data connection 334 known as the crossbar, which connects all processors/circuits 328, 330 and the accelerator 220 to each other in combination with further data connections 336, 352, 350, 338. The further data connections 352 are used to connect the CPUs 330_1 to 330_3 to the main data connection 334, the further data connections 350 to connect the main data connection 334 to the accelerator 220 and/or the memory circuit 332, and the further connections 338, which are fed to a shared data connection 336, are used to connect the peripheral circuits 328_1 to 328_4 to the main data connection 334.

The main data connection 334 enables data transmission at a many times higher frequency than the data transmission in the shared data connection 336.

The following table summarizes which measures are implemented for which purpose in the data processing device 300 or similar data processing devices, where "+" designates a positive action, "−" a negative action, and "o" is irrelevant to the designated feature.

| Feature | Latency | Data Rate | Design |
|---|---|---|---|
| Frequency of the data bus | + | + | − |
| Connection Architecture (shared) | − | o | + |
| Connection Architecture (Crossbar) | + | + | − |
| Types of data transmission (e.g., surge-like) | − | + | o |
| Implementation optimization (e.g. pipeline stages) | − | o | + |

However, the latest latency requirements for real-time applications are not achievable using this compromise design.

Even if technically advanced designs are used, such as the so-called network-on-chips (NoC), which enable bandwidth scalability, for example, the latency of the NoCs according to conventional solutions is not adequate for use in current real-time applications.

In various exemplary embodiments, a data processing device having an accelerator is provided, which enables applications involving both high data rates as well as those with low latency.

Figure 4:
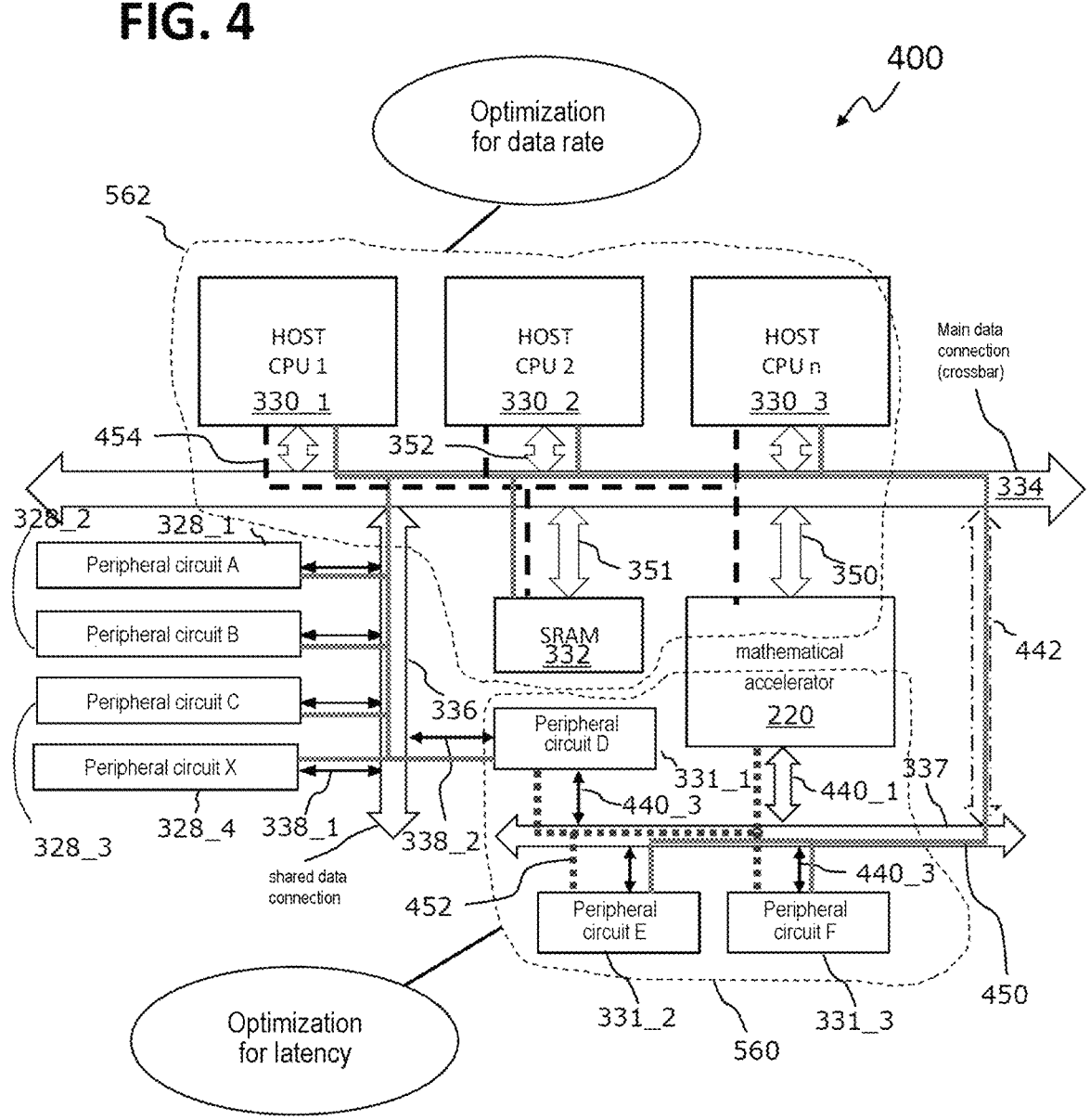
FIG. 4 shows a schematic illustration of a data processing device according to various exemplary embodiments.
Figure 5:
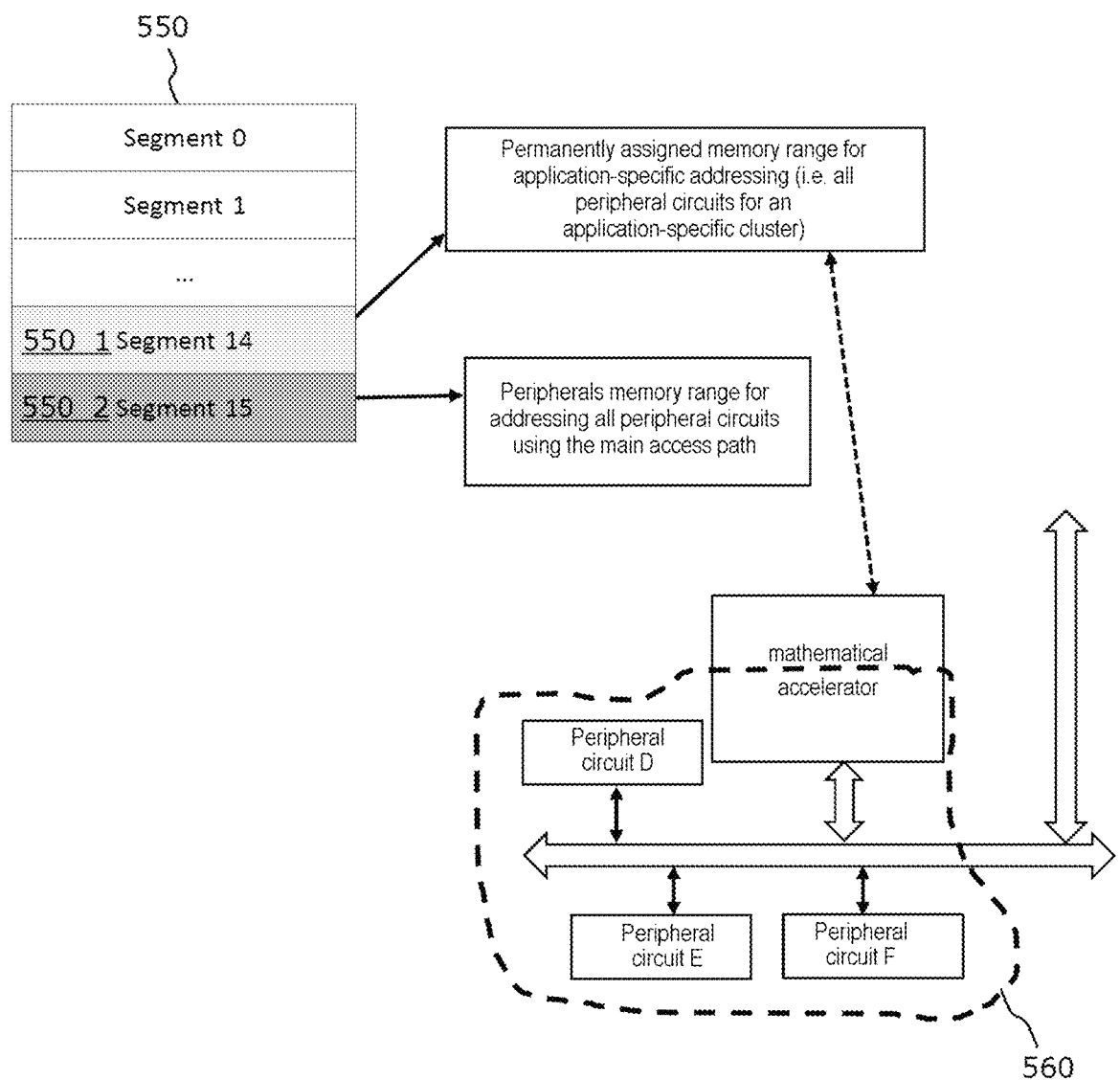
FIG. 5 shows a schematic illustration of an address register of a data processing device according to various exemplary embodiments.
Figure 6:
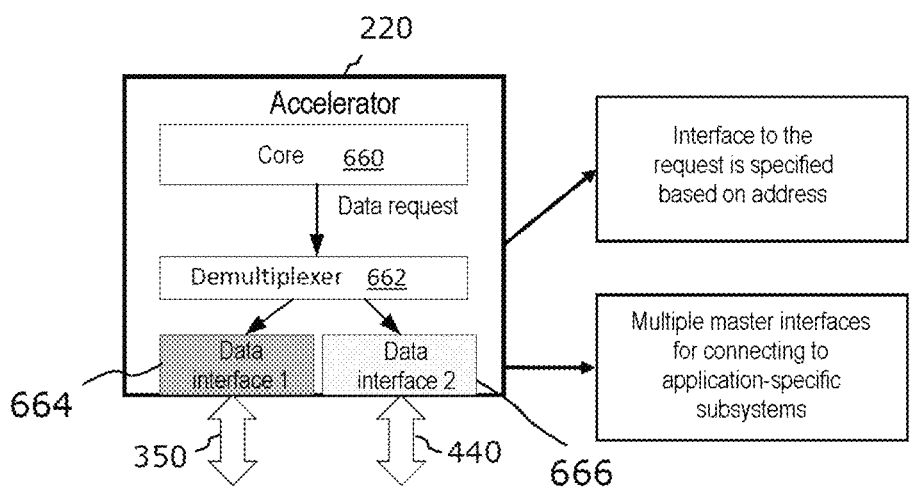
FIG. 6 shows a schematic illustration of an accelerator of a data processing device according to various exemplary embodiments.
Figure 7:
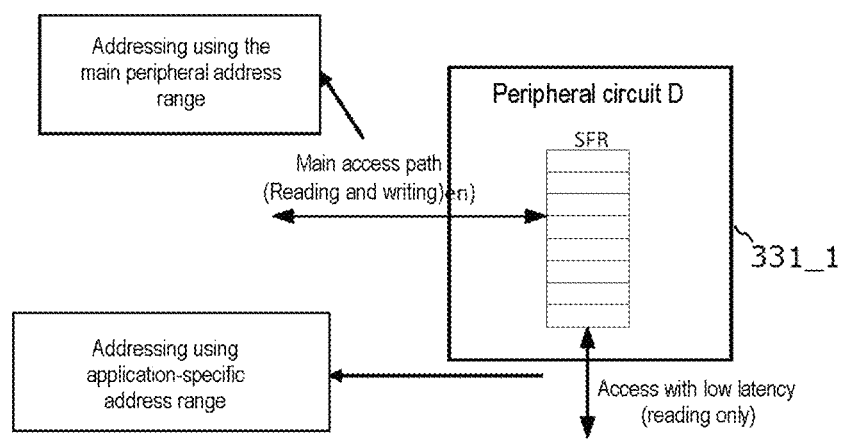
FIG. 7 shows a schematic illustration of a peripheral circuit of a data processing device according to various exemplary embodiments.

FIG. 4 shows a schematic illustration of a data processing device 400 according to various exemplary embodiments. FIG. 5 shows a schematic illustration of an address segment 550 of a data processing device 400 according to various exemplary embodiments. FIG. 6 shows a schematic illustration of an accelerator 220 of a data processing device 400 according to various exemplary embodiments, and FIG. 7 shows a schematic illustration of a peripheral circuit 700 of a data processing device 400 according to various exemplary embodiments.

The data processing device 400 can comprise at least one processor circuit 330 in various exemplary embodiments. Three processor circuits 330_1, 330_2 and 330_3 are shown here by way of example. The processor circuits 330 can comprise CPUs.

The data processing device 400 can also comprise an accelerator circuit 220, for example a mathematical accelerator circuit 220, for example of a type known for this purpose.

The data processing device 400 can also have at least one additional circuit 328, e.g. a peripheral circuit. The peripheral circuit can be located outside the central processor 330_1/330_2/330_3 and can be configured to provide a function such as data input/output, A/D conversion, etc.

In addition, the data processing device 400 can have a memory circuit 332, which forms, for example, a volatile or a non-volatile memory, such as an SRAM.

The memory circuit 332 can be considered a special type of peripheral circuit. Accordingly, descriptions which are given in the following for the at least one additional circuit 328 are also applicable to the memory circuit 332.

The data processing device 400 can also have at least one further additional circuit 331, e.g. a peripheral circuit. The peripheral circuit can be located outside the central processor 330_1/330_2/330_3 and can be configured to provide a function such as data input/output, A/D conversion, etc.

In addition, the data processing device 400 can comprise a first data connection 454, which connects the at least one processor circuit 330 to the accelerator circuit 220 and is configured to exchange data between the at least one processor circuit 330 and the accelerator circuit 220. In the exemplary embodiment shown, all three processor circuits 330_1, 330_2, 330_3 are connected to the accelerator circuit 220 by means of the first data connection 454. In other exemplary embodiments, only one or two of the processor circuits can be connected to the accelerator circuit 220 by means of the first data connection 454, e.g. only the processor circuit 330_3.

In addition, in various exemplary embodiments the at least one additional circuit 328, 332 can be connected to the accelerator circuit 220 by means of the first data connection 454. An example of this for the memory circuit 332 is shown in FIG. 4.

For example, the first data connection can comprise the main data connection 334, additional data connections 352 which connect the at least one processor circuit 330 to the main data connection 334, additional data connections 350 between the main data connection 334 and the accelerator 220, and additional data connections 351 between the main data connection 334 and the at least one additional circuit 328, 332 (in FIG. 4 the memory circuit 332).

In addition, the data processing device 400 can comprise a second data connection 450 which connects the at least one processor circuit 330 to the at least one additional circuit 328, 332 and, where applicable, to the at least one further additional circuit 331, and is configured to exchange data between the at least one additional circuit 328, 332 and the at least one processor circuit 330 and/or between the at least one further additional circuit 328, 331, 332 and the at least one processor circuit 330.

The second data connection 450 can comprise, for example, the main data connection 334, additional data connections 352 which connect the at least one processor circuit 330 to the main data connection 334, additional data connections 351 between the main data connection 334 and the at least one additional circuit 328, 332 (in FIG. 4 the memory circuit 332), one or more shared data connections 336, 337, each of which may be configured to connect the at least one additional circuit 328, 332 or the at least one further additional circuit 331 to the main data connection 334, further additional data connections 338, 440 between the shared data connections 336, 337 and one each of the peripheral circuits 328, 331 and a data connection 442 (possibly selectable and therefore shown by dashed lines) between the main data connection 334 and the shared data connection 337.

In order not to affect the clarity of FIG. 4, identical data connections are sometimes only labeled at one point, e.g. the further additional data connections 338_1 and 440_3, etc.

Optionally, the second data connection 450 can comprise an additional data connection 350 between the main data connection 334 and the accelerator 220 (not shown).

In different exemplary embodiments the first data connection can have a higher data rate or a lower latency than the second data connection 450.

To provide a better understanding, the reference signs etc. in the description of the data processing device 400 from FIG. 4 are used in such a way that the first data connection 454 allows the higher data rate, and a third data connection 452 described in further detail below has the lower latency. However, the terms "first" or "third" data connection are assigned arbitrarily, so that the data connection with the lower latency could be designated as the first data connection, and the data connection with the higher data rate as the third data connection.

The three (host) processor circuits 330_1, 330_2, and 330_3 together with the first data connection 454, the memory circuit 332 and the accelerator 220 form a data processing cluster 562 configured to optimize the data rate.

At least parts of the data processing cluster 562 configured to optimize the data rate can be physically adjacent, allowing an efficient design to be implemented.

Data connections that are shared between the first data connection 454 and the second data connection 450, e.g. the main data connection 334 and the additional data connections 351, 352 (optionally 350) can be used to minimize space requirements.

Data connections that are shared between the third data connection 452 and the second data connection 450, e.g. the shared data connection 337 and the additional data connections 440_3, can be used to minimize space requirements.

In various exemplary embodiments, as shown in FIG. 4 for example, the first data connection 454 and/or the second data connection 450 can form or comprise a so-called crossbar architecture. In these, the first data connection 454 for the at least one processor circuit 330 (here: the three CPU circuits 330_1, 330_2 and 330_3) can run via a main data connection 334, also known as a crossbar, which in various exemplary embodiments can enable a transmission of large amounts of data, for example by means of an increased transmission frequency and/or increased bandwidth.

In various exemplary embodiments the first data connection 454 may be optimized for the low latency (e.g., located near to the accelerator and therefore short) instead of the high data rate, and comprise more data connection segments or fewer data connection segments, etc.

In various exemplary embodiments the data processing device 400 can also have an address segment 550, an example of which is shown in FIG. 5. The address segment 550 can have a first address range 550_1, which has at least one first address for the at least one additional circuit 328, 331, 332, the at least one processor circuit 330 and the accelerator circuit 220, and a second address range 550_2 which has at least one second address for the at least one additional circuit 328, 331, 332, the at least one processor circuit 330 and the accelerator circuit 220.

The address segment 550 can be part of the at least one (host) processor circuit 330, or an address segment 550 that is not integrated into the at least one processor circuit 330. The address segment 550 can be configured such that the at least one processor circuit 330 can access it to retrieve an addressing instruction, or the at least one processor circuit 330 can have its own dedicated accessible copy of the address segment 550.

The data processing device 400 can be configured to exchange data using the first data connection 454 when addressing using one of the first addresses 550_1, and to exchange data using the second data connection 450 when addressing using one of the second addresses 550_2.

As already indicated above, according to various exemplary embodiments the data processing device 400 can also comprise at least one further additional circuit 331 (here: three peripheral circuits 331_1, 331_2 and 331_3) and a third data connection 452.

The third data connection 452 can connect the at least one additional processor circuit 331 to the accelerator circuit 220 and be configured to exchange data between the at least one further additional processor circuit 331 and the accelerator circuit 220.

In the event that the first data connection 454 has a higher data rate than the second data connection (which in the example of FIG. 4 may be the case, for example), the third data connection 452 can have a lower latency than the second data connection 450 and in the event that the first data connection 454 has a lower latency than the second data connection 450, the third data connection can have a higher data rate than the second data connection 450.

The three further additional (not necessarily, but in this example, peripheral) circuits 331_1, 331_2, and 331_3, together with the third data connection 452 and the accelerator 220, form a data processing cluster 560 configured to optimize the latency. At least parts of the data processing cluster 560 configured to optimize the data rate can be physically adjacent, allowing an efficient design to be implemented.

The address segment 550 can also have a third address range (not shown), which has at least one third address for the at least one further additional processor circuit 331 and the accelerator circuit 220, and wherein the data processing device 400 is also configured to exchange data using the third data connection 452 when addressing using one of the third addresses.

In other words, the addressing of a resource (e.g., the accelerator 220 of one of the processor circuits 330, one of the additional circuits 328, one of the further additional circuits 331 or vice versa) can be used in various exemplary embodiments to determine which of the data connections was used to perform the data transfers, that is, either the data connection optimized for high data rate (here the first data connection 454), the data connection optimized for low latency (here the third data connection 452) or the "normal" data connection (here the second data connection 450).

For example, in a program code for executing a program that requires data exchange of large amounts of data, the accelerator 220, or conversely the processor 330 can be addressed by means of its first address to use the first data connection 454 optimized for large amounts of data.

In a program code for executing a neither data-intensive nor time-critical program, for example, for configuring one of the additional circuits 328, 332 or one of the further additional circuits 331, the additional circuit 328, 332 and/or the further additional circuit 331 (optionally the accelerator 220), or conversely, the processor 330, can be addressed using its second address in order to use the "normal" second data connection 452, which is optimized neither for data rate nor latency.

In a program code for executing a program that requires low latency, the accelerator 220, or conversely the processor 330, can be addressed by means of its third address in order to use the third data connection 452 optimized for low latency.

FIG. 7 shows a schematic illustration of a further additional circuit 331_1 (here: a peripheral circuit) of a data processing device 400 according to various exemplary embodiments. Two different types of access to the data stored in a so-called Special Function Register (SFR) are illustrated.

For example, the peripheral circuit 331_1 can be accessible for fast read (or read-only) access, i.e. with low latency via the third data connection 452 (e.g. by means of the accelerator 220), and accessible for read and/or write access with e.g. average data rate and average latency by means of the second data connection 450.

FIG. 6 shows a schematic illustration of an accelerator circuit 220 of a data processing device 400 according to various exemplary embodiments.

The accelerator circuit 220 can have a processor core 660, a first data interface 664 for transferring data using the first data connection 450, a second data interface 666 for transferring data using the third data connection 452, and a demultiplexer 662 for switching between the first data interface 664 and the second data interface 666. If necessary, the accelerator 220 can also have another data interface for transferring data using the second data condition 450, and the demultiplexer 662 can be configured to switch between three data interfaces.

Using the design described above, in various exemplary embodiments for a data processing device 400 it is feasible to meet design requirements while meeting strict requirements for applications requiring low latency and/or applications that generate a high data rate.

The high data-rate applications and low-latency applications can be addressed or executed using the same system, the data processing device 400.

An application- or usage-specific addressing can enable application-optimized (latency- or data-rate-optimized) clusters 560, 562 to be introduced.

An address analysis that can be performed upon a data request can allow the data request to be redirected to application-specific master interfaces 664, 666, which provide access to a plurality of different bus connections (with different characteristics in terms of manageable data rate and latency).

By mapping addresses from, for example, peripheral SFRS to multiple application-specific address ranges, the SFR addresses can be accessed using different bus clusters 560, 562.

A data connection can then be configured for read and write access and configured as the main access path for the system, and a further read-only access can enable an application-specific access path, e.g. with low latency.

This enables applications with software-based control loops (e.g. in power/voltage converter applications) to be realized in real time in the microsecond range.

Figure 8:
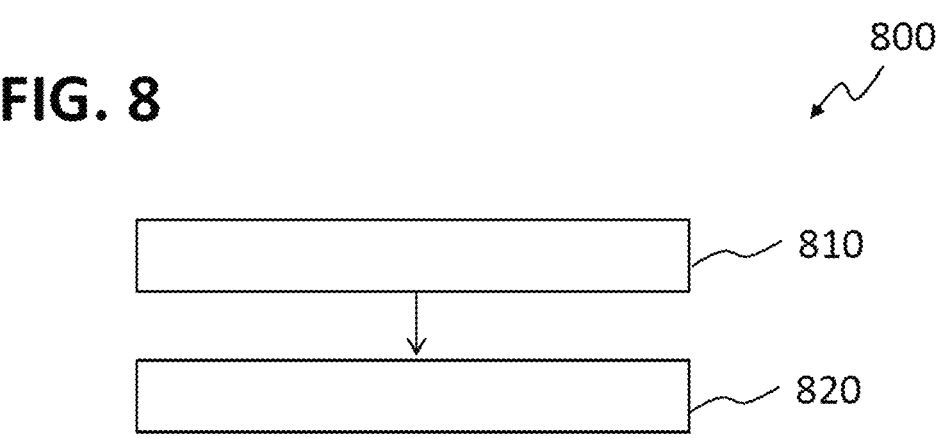
FIG. 8 shows a flowchart of a method for operating a data processing device according to various exemplary embodiments.

FIG. 8 shows a flowchart 800 of a method for operating a data processing device according to various exemplary embodiments.

The data processing device can comprise at least one processor circuit, at least one additional circuit, an accelerator circuit, a first data connection which at least connects the at least one processor circuit to the accelerator circuit, a second data connection which connects the at least one processor circuit to the at least one additional circuit, wherein the first data connection has a higher data rate or a lower latency than the second data connection, and has an address segment comprising a first address range which has at least one first address each for the at least one additional circuit and the accelerator circuit, and a second address range which has at least one second address each for the at least one additional circuit and the accelerator circuit.

The method can comprise exchanging data using the first data connection when addressing using one of the first addresses (810) and exchanging data using the second data connection when addressing using one of the second addresses (820).

In the following text, a summary of some exemplary embodiments is given.

Exemplary embodiment 1 is a data processing device. The data processing device comprises at least one processor circuit, at least one additional circuit, an accelerator circuit, a first data connection which at least connects the at least one processor circuit to the accelerator circuit and is configured to exchange data between the at least one processor circuit and the accelerator circuit, a second data connection which connects the at least one processor circuit to the at least one additional circuit and is configured to exchange data between the at least one additional circuit and the processor circuit, wherein the first data connection has a higher data rate or a lower latency than the second data connection, and comprises an address segment having a first address range, which has at least one first address each for the at least one additional circuit and the accelerator circuit, and a second address range which has at least one second address each for the at least one additional circuit and the accelerator circuit, wherein the data processing device is configured to exchange data using the first data connection when addressing using one of the first addresses, and to exchange data using the second data connection when addressing using one of the second addresses.

Exemplary embodiment 2 is a data processing device according to exemplary embodiment 1, which also comprises at least one further additional circuit and a third data connection, which connects the at least one additional circuit to the accelerator circuit and is configured to exchange data between the at least one further additional circuit and the accelerator circuit, wherein in the event that the first data connection has a higher data rate than the second data connection, the third data connection has a lower latency than the second data connection and in the event that the first data connection has a lower latency than the second data connection, the third data connection has a higher data rate than the second data connection, wherein the address segment also having a third address range, which has at least one third address for the at least one further additional circuit and the accelerator circuit, and wherein the data processing device is also configured to exchange data using the third data connection when addressing using one of the third addresses.

Exemplary embodiment 3 is a data processing device according to exemplary embodiment 1 or 2, wherein the first data connection is configured to transmit the data at a higher frequency than the second data connection.

Exemplary embodiment 4 is a data processing device according to any one of the exemplary embodiments 1 to 3, wherein the first data connection, if it has lower latency than the second data connection, is shorter than the second data connection.

Exemplary embodiment 5 is a data processing device according to any one of the exemplary embodiments 1 to 4, wherein the at least one processor circuit has a plurality of processor circuits and wherein the first data connection and/or the second data connection is/are also configured to exchange the data between a first of the plurality of processor circuits and a second of the plurality of processor circuits.

Exemplary embodiment 6 is a data processing device according to any one of the exemplary embodiments 1 to 6, wherein the second data connection comprises a section of the first data connection and a further data connection section.

Exemplary embodiment 7 is a data processing device according to any one of the exemplary embodiments 2 to 6, wherein the second data connection comprises a section of the first data connection and/or a section of the third data connection and a further data connection section.

Exemplary embodiment 8 is a data processing device according to any one of the exemplary embodiments 2 to 7, wherein the accelerator comprises a demultiplexer for switching between the second data connection and the third data connection for the data exchange.

Exemplary embodiment 9 is a data processing device according to any one of the exemplary embodiments 2 to 7, wherein the accelerator comprises a demultiplexer for switching between the first data connection, the second data connection and the third data connection for the data exchange.

Exemplary embodiment 10 is a data processing device according to any one of the exemplary embodiments 1 to 9, wherein the at least one processor circuit comprises a main processor.

Exemplary embodiment 11 is a data processing device according to any one of the exemplary embodiments 1 to 10, wherein the at least one additional circuit forms a peripheral circuit.

Exemplary embodiment 12 is a data processing device according to any one of the exemplary embodiments 2 to 11, wherein the at least one further additional circuit forms a peripheral circuit.

Exemplary embodiment 13 is a data processing device according to any one of the exemplary embodiments 1 to 12, which forms a network-on-chip.

Exemplary embodiment 14 is a method for operating a data processing device. The data processing device comprises at least one processor circuit, at least one additional circuit, an accelerator circuit, a first data connection which at least connects the at least one processor circuit to the accelerator circuit, a second data connection which connects the at least one processor circuit to the at least one additional circuit, wherein the first data connection has a higher data rate or a lower latency than the second data connection, and has an address segment comprising a first address range which has at least one first address each for the at least one additional circuit and the accelerator circuit, and a second address range which has at least one second address each for the at least one additional circuit and the accelerator circuit. The method comprises exchanging data using the first data connection when addressing using one of the first addresses, and exchanging data using the second data connection when addressing using one of the second addresses.

Exemplary embodiment 15 is a method according to exemplary embodiment 14, wherein the data processing device also has at least one further additional circuit and a third data connection, which connects the at least one additional circuit to the accelerator circuit, wherein in the event that the first data connection has a higher data rate than the second data connection, the third data connection has a lower latency than the second data connection and in the event that the first data connection has a lower latency than the second data connection, the third data connection has a higher data rate than the second data connection, and wherein the address segment also has a third address range, which has at least one third address for the at least one additional circuit and the accelerator circuit. The method also comprises exchanging data between the at least one further additional circuit and the accelerator circuit using the third data connection when addressing using one of the third addresses.

Exemplary embodiment 16 is a method according to exemplary embodiment 14 or 15, wherein the first data connection is configured to transmit the data at a higher frequency than the second data connection.

Exemplary embodiment 17 is a method according to exemplary embodiments 14 to 16, wherein the first data connection, if it has lower latency than the second data connection, is shorter than the second data connection.

Exemplary embodiment 18 is a method according to any one of the exemplary embodiments 14 to 17, the at least one processor circuit having a plurality of processor circuits, and the method also comprising exchanging the data between a first of the plurality of processor circuits and a second of the plurality of processor circuits using the first data connection and/or the second data connection Exemplary embodiment 19 is a method according to any one of the exemplary embodiments 14 to 18, wherein the second data connection comprises a section of the first data connection and a further data connection section.

Exemplary embodiment 20 is a method according to any one of the exemplary embodiments 15 to 18, wherein the second data connection comprises a section of the first data connection and/or a section of the third data connection and a further data connection section.

Exemplary embodiment 21 is a method according to any one of the exemplary embodiments 14 to 20, wherein the accelerator comprises a demultiplexer, and the method also comprises switching between the first data connection and the second data connection for the data exchange.

Exemplary embodiment 22 is a method according to any one of the exemplary embodiments 15 to 20, wherein the accelerator comprises a demultiplexer, the method also comprising switching between the first data connection, the second data connection and the third data connection for the data exchange.

Exemplary embodiment 23 is a method according to any one of exemplary embodiments 14 to 22, wherein the at least one processor circuit comprises a main processor.

Exemplary embodiment 24 is a method according to any one of the exemplary embodiments 14 to 23, wherein the at least one additional circuit forms a peripheral circuit.

Exemplary embodiment 25 is a method according to any one of the exemplary embodiments 15 to 24, wherein the at least one further additional circuit forms a peripheral circuit.

Exemplary embodiment 26 is a method according to any one of exemplary embodiments 14 to 25, wherein the data processing device forms a network-on-chip.

Additional advantageous designs of the device are obtained from the description of the method and vice versa.

The invention claimed is:

1. A data processing device, comprising:
   at least one processor circuit;
   at least one additional circuit;
   an accelerator circuit;
   a first data connection which at least connects the at least one processor circuit to the accelerator circuit and is configured to exchange data between the at least one processor circuit and the accelerator circuit;
   a second data connection which connects the at least one processor circuit to the at least one additional circuit and is configured to exchange data between the at least one additional circuit and the processor circuit;
   wherein the first data connection has a higher data rate or lower latency than the second data connection; and
   an address segment, comprising:
   a first address range, which has at least one first address each for the at least one additional circuit and the accelerator circuit; and
   a second address range, which has at least one second address each for the at least one additional circuit and for the accelerator circuit;
   wherein the data processing device is configured:
   to exchange data using the first data connection when addressing using one of the first addresses; and
   to exchange data using the second data connection when addressing using one of the second addresses.

2. The data processing device as claimed in claim 1, further comprising:
   at least one further additional circuit; and
   a third data connection, which connects the at least one further additional circuit to the accelerator circuit and is configured to exchange data between the at least one further additional circuit and the accelerator circuit;
   wherein in the event that the first data connection has a higher data rate than the second data connection, the third data connection has a lower latency than the second data connection and in the event that the first data connection has a lower latency than the second data connection, the third data connection has a higher data rate than the second data connection;
   wherein the address segment also has a third address range, which has at least one third address for the at least one further additional circuit and the accelerator circuit; and
   wherein the data processing device is also configured to exchange data using the third data connection when addressing using one of the third addresses.

3. The data processing device as claimed in claim 1,
   wherein the first data connection is configured to transmit the data at a higher frequency than the second data connection.

4. The data processing device as claimed in claim 1,
   wherein the first data connection, if it has lower latency than the second data connection, is shorter than the second data connection.

5. The data processing device as claimed in claim 1,
   wherein the at least one processor circuit comprises a plurality of processor circuits, and wherein the first data connection and/or the second data connection is/are also configured to exchange the data between a first of the plurality of processor circuits and a second of the plurality of processor circuits.

6. The data processing device as claimed in claim 1, wherein the second data connection has a section of the first data connection and a further data connection section.

7. The data processing device as claimed in claim 2, wherein the second data connection has a section of the first data connection and/or a section of the third data connection and a further data connection section.

8. The data processing device as claimed in claim 2, wherein the accelerator circuit comprises a demultiplexer to switch between the second data connection and the third data connection for the data exchange.

9. The data processing device as claimed in claim 2, wherein the accelerator circuit comprises a demultiplexer to switch between the first data connection, the second data connection and the third data connection for the data exchange.

10. The data processing device as claimed in claim 1, wherein the at least one processor circuit comprises a main processor.

11. The data processing device as claimed in claim 1, wherein the at least one additional circuit forms a peripheral circuit.

12. The data processing device as claimed in claim 1, which forms a network-on-chip.

13. A method for operating a data processing device which comprises at least one processor circuit, at least one additional circuit, an accelerator circuit, a first data connection which at least connects the at least one processor circuit to the accelerator circuit, a second data connection which connects the at least one processor circuit to the at least one additional circuit, wherein the first data connection has a higher data rate or a lower latency than the second data connection, and has an address segment comprising a first address range which has at least one first address each for the at least one additional circuit and the accelerator circuit, and a second address range which has at least one second address each for the at least one additional circuit and the accelerator circuit, the method comprising:
  exchanging data using the first data connection when addressing using one of the first addresses; and
  exchanging data using the second data connection when addressing using one of the second addresses.

14. The method as claimed in claim 13, wherein the data processing device also comprises at least one further additional circuit and a third data connection, which connects the at least one additional circuit to the accelerator circuit, wherein in the event that the first data connection has a higher data rate than the second data connection, the third data connection has a lower latency than the second data connection and in the event that the first data connection has a lower latency than the second data connection, the third data connection has a higher data rate than the second data connection, and wherein the address segment also has a third address range, which has at least one third address for the at least one further additional circuit and the accelerator circuit, said method also comprising:
  exchanging data between the at least one further additional circuit and the accelerator circuit using the third data connection when addressing using one of the third addresses.

15. The method as claimed in claim 13, wherein the first data connection is configured to transmit the data at a higher frequency than the second data connection.

16. The method as claimed in claim 13, wherein the first data connection, if it has lower latency than the second data connection, is shorter than the second data connection.

17. The method as claimed in claim 13, wherein the at least one processor circuit comprises a plurality of processor circuits, the method also comprising:
  exchanging the data between a first of the plurality of processor circuits and a second of the plurality of processor circuits using the first data connection and/or the second data connection.

18. The method as claimed in claim 13, wherein the second data connection comprises a section of the first data connection and a further data connection section.

19. The method as claimed in claim 14, wherein the second data connection comprises a section of the first data connection and/or a section of the third data connection and a further data connection section.

20. The method as claimed in claim 14, wherein the accelerator comprises a demultiplexer, the method also comprising:
  switching between the second data connection and the third data connection for the data exchange.

21. The method as claimed in claim 14, wherein the accelerator comprises a demultiplexer, the method also comprising:
  switching between the first data connection, the second data connection and the third data connection for the data exchange.

22. The method as claimed in claim 13, wherein the at least one processor circuit comprises a main processor.

23. The method as claimed in claim 13, wherein the at least one additional circuit forms a peripheral circuit.

24. The method as claimed in claim 13, wherein the data processing device forms a network-on-chip.

* * * * *